Nov. 4, 1958 J. M. COOMBS 2,859,429

DATA STORAGE APPARATUS CONTROLS

Original Filed May 2, 1949 5 Sheets-Sheet 1

Inventor
John M. Coombs
By Cushman, Darby & Cushman
attorneys

Inventor
John M. Coombs
By Cushman, Darby & Cushman
attorneys

Nov. 4, 1958 J. M. COOMBS 2,859,429

DATA STORAGE APPARATUS CONTROLS

Original Filed May 2, 1949

5 Sheets-Sheet 3

Inventor

John M. Coombs

By Cushman, Darby Cushman

Attorneys

Nov. 4, 1958 J. M. COOMBS 2,859,429

DATA STORAGE APPARATUS CONTROLS

Original Filed May 2, 1949 5 Sheets-Sheet 4

Inventor

John M. Coombs

By Cushman, Darby & Cushman

Attorneys

Nov. 4, 1958 J. M. COOMBS 2,859,429

DATA STORAGE APPARATUS CONTROLS

Original Filed May 2, 1949 5 Sheets-Sheet 5

Voltage at reading head

Differentiated voltage

Output voltage

Inventor
John M. Coombs

By Cushman, Darby & Cushman
Attorneys

United States Patent Office 2,859,429

Patented Nov. 4, 1958

2,859,429

DATA STORAGE APPARATUS CONTROLS

John M. Coombs, St. Paul, Minn., assignor, by mesne assignments, to Sperry Rand Corporation, New York, N. Y., a corporation of Delaware Original application May 2, 1949, Serial No. 90,941. Divided and this application January 23, 1952, Serial No. 267,737

4 Claims. (Cl. 340—174)

The present invention relates to data storage apparatus and, more particularly, to means for controlling the transmission of data with respect to the drum, tape or other data storage element of such an apparatus. It will be understood that the transmission of data with respect to such an element may involve the recording of data upon the element, alteration, including erasure, of data upon the element, or the reading of data previously recorded upon the element.

This application is a division of my copending application Serial No. 90,941, filed May 2, 1949, now abandoned.

In various lines of endeavor, for example, computing and recording, it is desirable to store information for a period of time and yet have the information readily available for reading or alteration. Apparatus and systems for this purpose are disclosed in the application of Arnold A. Cohen, William R. Keye and Charles B. Tompkins for Data Storage Systems, Serial No. 16,998, filed March 25, 1948, Patent No. 2,540,654, and in the application of John M. Coombs and Charles B. Tompkins for Data Storage Apparatus, Serial No. 16,997, filed March 25, 1948, Patent No. 2,617,705.

Although the present invention may be used with various forms of data storage apparatus, in the embodiment of the invention disclosed herein for purposes of example, the data storage element is a rotary drum having paramagnetic tapes upon its periphery and with a group of magnets positioned adjacent each of the tapes to apply or record data or signals upon the tape, and erase, read or alter such data, all as particularly described in said applications. As is pointed out in said Coombs, and Tompkins, application, the drum used therein may be rotated at such rate that the drum periphery will have a speed of the order of 400 inches per second, and with a drum thirty-four inches in diameter, the track associated with each magnet may include 5,340 cells or discrete areas to receive signals.

During either reading or erasing of signals the drum of said applications may be continuously rotated at a speed of the order of 220 R. P. M. As is also mentioned in said applications, signals may be altered or recorded during rotation of the drum at the high speed mentioned.

The primary object of the invention of this divisional application is to provide such spacing between transducers operating in conjunction with a record medium as to preclude the precessing or shifting of data read from and re-recorded thereon.

Other objects and advantages of the invention will be apparent from the following specification and accompanying drawings, in which drawings Figure 1 is a front elevation of apparatus into which the invention may be conveniently embodied.

Figure 1:
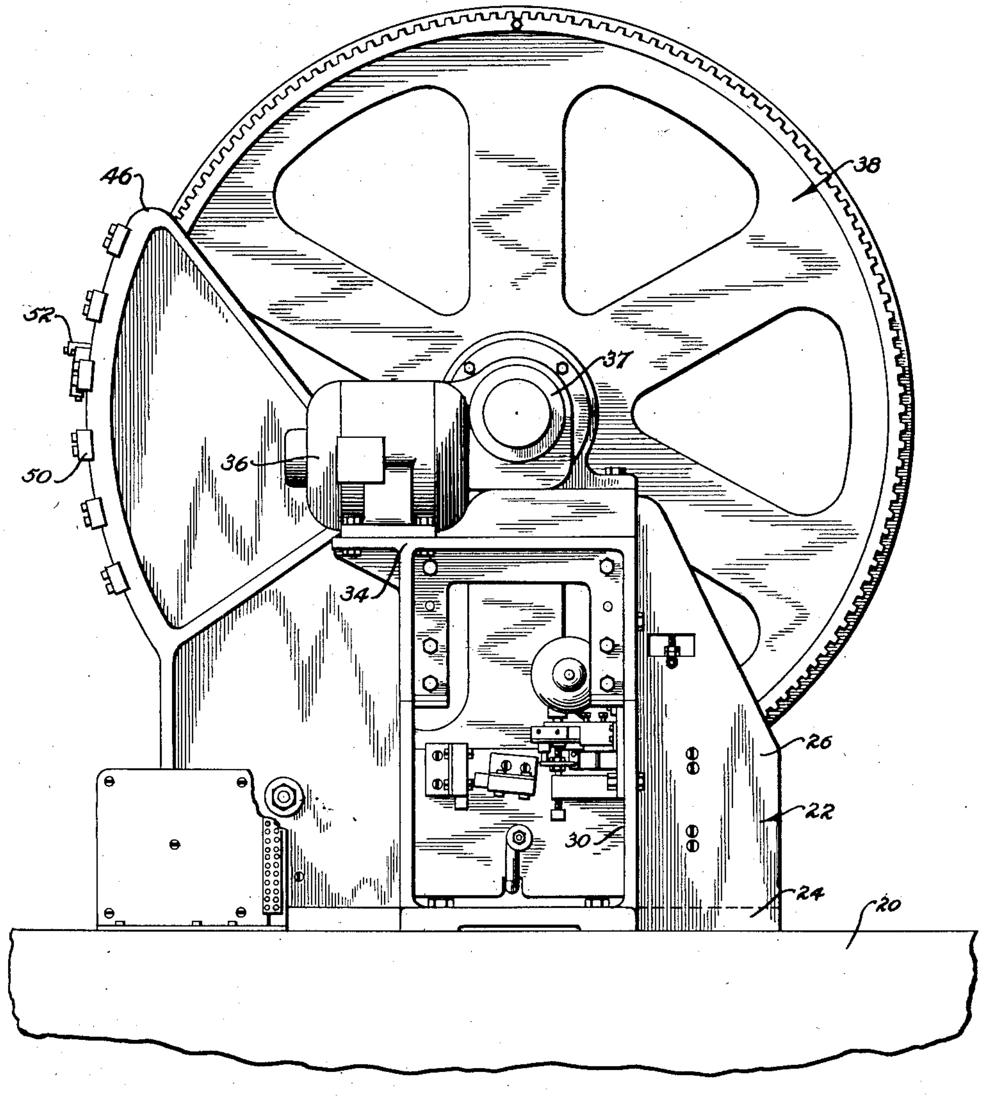
Figure 3:
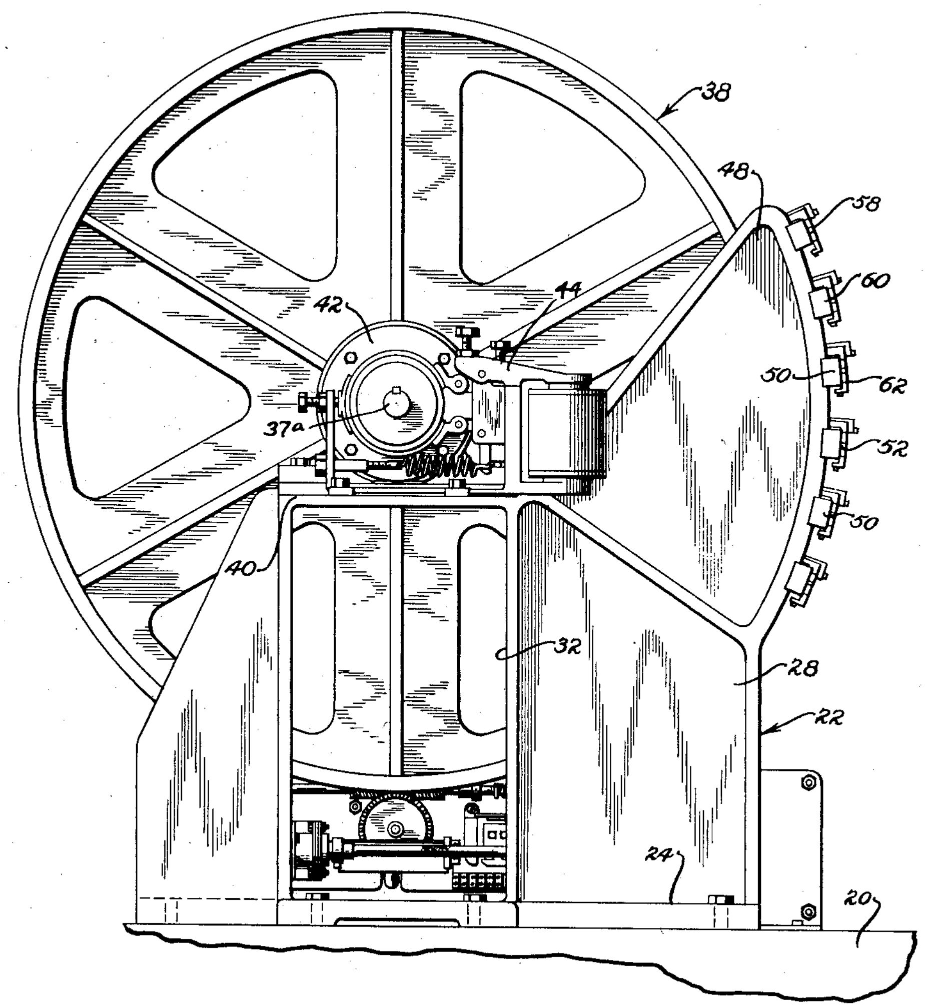
Figure 3 is a rear view of the apparatus.

Referring to Figure 1, the numeral 20 designates a platform, table or the bottom wall of a cabinet or other support upon which the apparatus would be positioned. The numeral 22 generally designates the stationary frame of the apparatus. Frame 22 includes a lower horizontally extending plate 24 preferably directly secured to the support 20 and also includes front and rear vertically extending frame walls 26 and 28. As is best indicated in Figures 1 and 3, the respective front and rear frame walls 26 and 28 may be provided with openings 30 and 32 intermediate their ends. The opening 30 at the top of the front frame wall 26 is bridged by a forwardly extending supporting platform 34 for a motor 36, as well as by a support for the front journal 37 for the shaft **37*a* of data storage drum 38. Similarly, as is shown in Figure 3, the opening 32 in the rear frame wall 28 is bridged by a plate 40 which supports the rear journal 42 for the drum shaft 37*a*, as well as a brake 44 hereinafter described. As is best shown in Figures 1 and 3, the frame walls 26 and 28 project upwardly at one end thereof as indicated at 46 and 48, respectively. These upwardly projecting portions carry cross bars 50 arranged concentrically with the periphery of drum 38. As is hereinafter described, the cross bars 50 support magnets generally designated 52**.

As is described in said Cohen et al. and Coombs et al. patents, the drum may have an outside diameter of thirty-four inches and a width of approximately ten and one-half inches. The drum is formed of aluminum or other non-magnetizable material and will have its periphery covered with magnetic tape, the tape being iron oxide coated paper tape or other suitable tape or coating including paramagnetic material. A number of signal or data storage tracks would be spaced or located upon the width of the drum so that each track extends circumferentially of the drum. With a drum 38 having a width of ten and one-half inches, forty tracks can be provided, with the track center-lines one-quarter of an inch apart.

Figure 2:
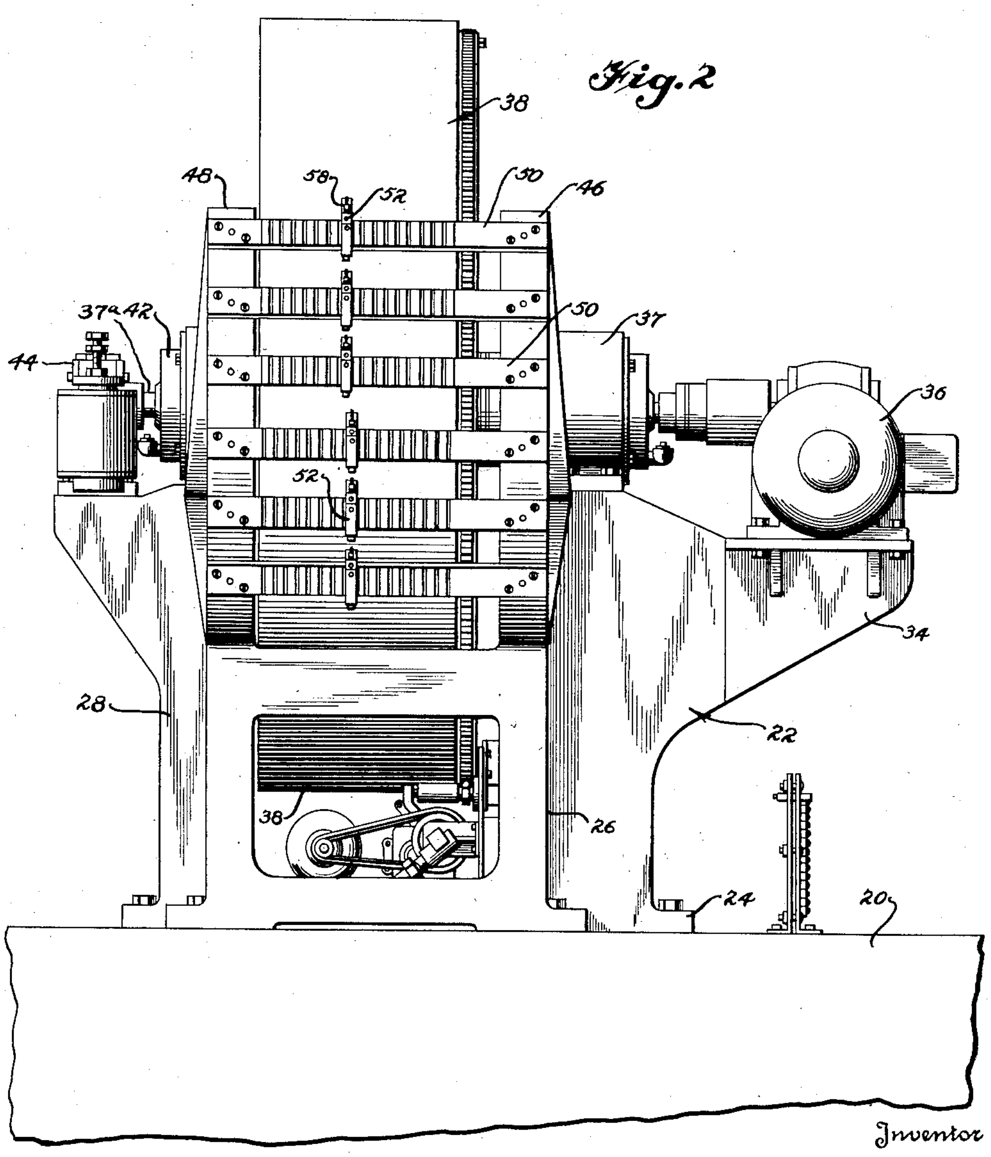
Figure 2 is a side view looking toward Figure 1 from the left of the latter figure.

By the system illustrated in the drawings, each track upon the drum 38, other than the timing and control tracks, will have a group of three magnets 52 associated therewith, the three magnets being respectively mounted on vertically adjacent cross bars 50 so that they will be spaced circumferentially of the path of the drum. The uppermost magnet, designated 58, of each group, will be a re-writing or altering magnet, the next lower magnet designated 60 may be used for erasing, as well as for original or fresh recording or writing, while the lowermost magnet 62 of the series is a reading magnet. As is indicated in Figure 2, because the magnets must usually be of a greater width than the drum tracks with which they are associated, the three upper cross bars 50 carry the magnets for alternate tracks of the drum and the magnets for the intervening tracks are supported upon the three lower cross bars 50.

*Magnet controlling circuits—Recording operation—Figures 1–4*

The magnet 60 Fig. 3 associated with each track or tape of the drum will be used for both erasing and original recording, the reading magnet 62 will only be used for reading or analyzing data upon the drum, while the third magnet 58 of the group associated with each track will be used for high speed rerecording or for alteration of data already upon the drum.

The apparatus may be operated to provide entirely discrete signals even through the cells or areas to which signals are applied are spaced on a tape or track as closely together as two hundred to the inch. However, in order to obtain satisfactory results, including the ability to find every cell and its signal with the aid of a timing track such as described in said Cohen et al. patent, care must be exercised to have every signal exactly and properly located in its storage cell or area. This can be done without difficulty if it is borne in mind that the matter of whether the drum is stationary or moving at high speed (for example, at 200 R. P. M.) will affect the point at which a signal for a given cell will be applied to that cell by a fixed magnet. It is because of this that separate magnets are used for step-by-step or slow speed recording and high speed recording. Thus, with a magnet 60 used for step-by-step recording positioned at a given point relative to a track, the magnet 58 used for high speed recording upon the same track will be so positioned that when the drum is rotating at high speed, the magnet 58 will impress a signal at the same point in any cell that the signal from magnet 60 would fall upon that cell. In more detail, referring to Figure 2, the gap of a magnet 58 will not be spaced from the gap of the magnet 60 for the same track by a distance exactly equal to a multiple of the distance between the centerpoints of two adjacent cells but, instead, the spacing of one gap from the other will be a given multiple of the cell spacing, plus a fraction of that cell spacing. The cellular spacing, that is, the distance between like points of adjacent cells, may be termed *d*.

Figure 4:
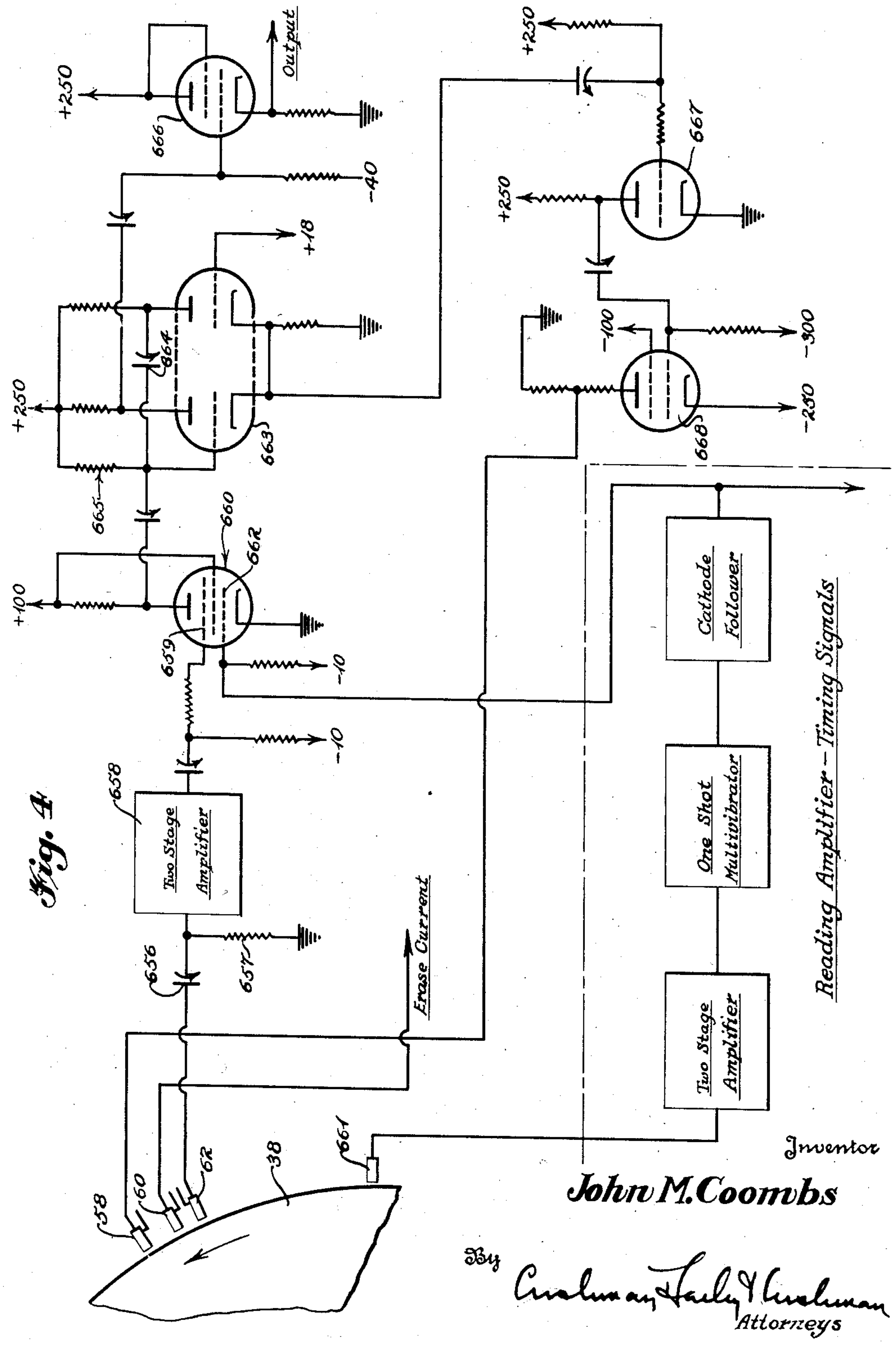
Figure 4 is a diagrammatic view showing circuits for use in reading and re-recording information.

In some instances, it is desirable to read data signals carried by drum 38, erase them, and then re-record them upon another part of the drum, perhaps with some alteration of the signals. Figure 4 diagrammatically shows circuits involved in this action, the circuit being duplicated for each of the tracks or tapes involved. Tracks which are to be used for timing will not be included in the recording and erasing circuits of Figure 4 because timing signals will not be either erased or rewritten.

Figure 5:
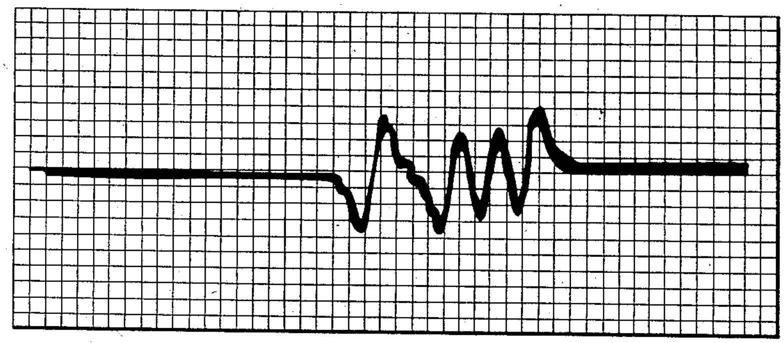
Figures 5, 6 and 7 show the voltage characteristics of signals obtained at stages in the circuit of Figure 4.
Figure 6:
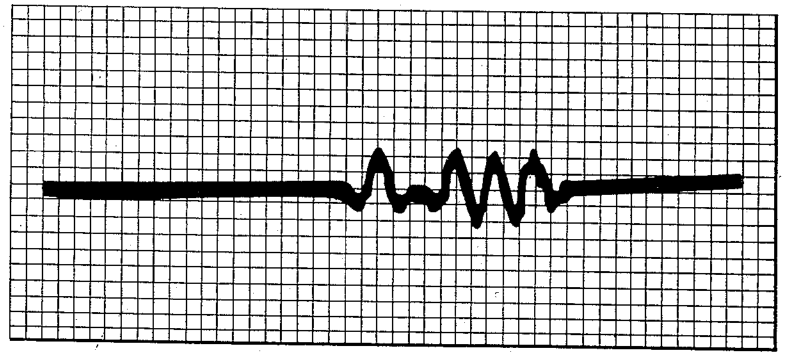
Figure 7:
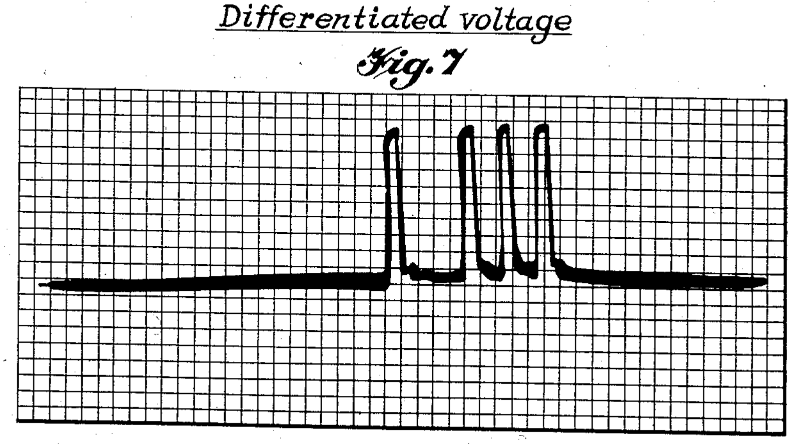

As drum 38 rotates with the circuit of Figure 4 in effect, a magnetized area or cell of the drum will pass beneath the reading magnet or head 62 and a signal having the characteristics of those shown in Figure 5 will be generated in the magnet. This signal will be differentiated by the elements 656 and 657 and the resultant signal (one of a number such as shown in Figure 6) will be fed to a two-stage amplifier 658. The positive output pulse from amplifier 658 will be fed to the suppressor grid 659 of gating tube 660. Simultaneously with the appearance of the signal at reading magnet 62, a timing signal carried on a timing track of the drum as described in said Cohen et al. patent will pass beneath reading magnet 661 associated with that timing track. The signal thereby generated in head 661 is applied to an electrical circuit which in turn produces a positive timing pulse at the control grid 662 of gating tube 660 at the same time the pulse from the reading head 62 appears on grid 659. Tube 660 is normally biased to current cut-off but the simultaneous appearance of the positive pulse on grids 659 and 662 produces a negative output pulse. This negative output pulse initiates the action of a one-shot multivibrator 663, the period of operation of the multivibrator being determined largely by the circuit elements 664 and 665. The output of cathode follower 666 driven by a positive pulse from the one-shot multivibrator 663 constitutes the record of the signals being read from the track on drum 38. A representative series of output signals of cathode follower 666 is shown in Figure 7. It will be observed that the circuit just described comprises a means for obtaining data from a track and that the output of tube 666 can be used to operate other apparatus in accordance with data on the drum.

If the data is to be re-recorded on the same track of the drum, a negative voltage pulse, obtained at the cathode of one-shot multivibrator 663, is amplified and inverted by tube 667. The resultant output, applied to rewriting amplifier 668, produces a current through high speed re-recording magnet 58 and results in the magnetization of the drum cell then opposite magnet 58. Because the operation of the circuits described above is very nearly instantaneous, as well as because drum 38 is being rotated at high speed of the order of 220 R. P. M. by motor 36, the signal received from the drum by a reading magnet 62 will be rewritten by re-recording head 58 at practically the same instant. However, the distance between magnet 62 and magnet 58 with relation to the speed of rotation of drum 38 by motor 36 must be carefully maintained by preset adjustments to keep the re-recorded signals aligned with the timing signals present upon the timing track associated with timing head 661. The signals which have been brought under reading magnet 62 for re-recording by magnet 58 will be erased by the erasing (and slow speed recording) magnet 60 and before they reach the head 58. Thus, during the re-recording operation, no signals will exist on the track between the magnets 60 and 58. Insofar as the operation just described is concerned, the maximum length of a track or tape available for recording information is equal to the circumference of the drum 38 minus the short distance between the magnets 62 and 58 indicated in Figures 1 and 4.

It will be understood that high speed recording other than the re-recording described above can also be performed upon drum 38, i. e., without simply transferring data from one point upon the drum to another point.

It will be observed that the magnets or corresponding elements used with the data storage element are all data or signal transmitting elements, regardless of whether they erase, alter, read, or record data or signals. Also, it will be clear that the data to be transmitted may be represented by signals which are of a form other than magnetic pulses.

The terminology used in the specification is for the purpose of description and not of limitation, the scope of the invention being defined in the claims.

I claim:

1. In recording apparatus, a movable record member, and at least two transducers, means for mounting the transducers in operative relation to the record member, means for moving the record member in a predetermined path relative to the transducers so that the transducers sweep out tracks of the record member, one of the transducers being mounted for reading data in cells spaced apart a distance *d* along the tracks while the record is moving at a predetermined relative speed, the second transducer being mounted along the track swept thereby at a location which with respect to the effective location of the first transducer in the track of the second transducer is zero times or an integral multiple 1 or greater of said spacing *d* plus a fraction thereof, and means interconnecting the first and second transducers for energizing the second transducer for digital recording in response to reading in the first transducer, said fractional spacing being selected to relate the speed of record movement to the delay of said means interconnecting the first and second transducers so that said constant cellular spacing *d* is maintained and the location of cells on the record is maintained as data is recorded in cells in response to reading from cells while the record is in motion.

2. Apparatus as in claim 1 and further including a third transducer, mounting means for the third transducer and positioned to place the third transducer along the track swept out by the first transducer a distance from the first transducer which is an integral multiple of said distance *d*, and means indexed with record driving means and connected with said third transducer for energizing said third transducer for recording in a cell while the record is stopped, whereby an array of cells may be set up by successive operations, with uniform cell spacing *d*.

3. Recording apparatus as in claim 1 wherein the mounting means for the transducers are positioned to place said first and second transducers along the same track.

4. Apparatus as in claim 1 wherein the mounting means for the transducers are positioned to place the first and second transducers along separate tracks.

References Cited in the file of this patent

UNITED STATES PATENTS

| | | |
|---|---|---|
| 1,038,380 | Johanson | Sept. 10, 1912 |
| 1,545,078 | Angus | July 7, 1925 |
| 2,300,320 | Swartzel | Oct. 27, 1942 |
| 2,424,633 | Rieber | July 29, 1947 |
| 2,530,584 | Pontius | Oct. 21, 1950 |
| 2,574,707 | Pettus | Nov. 13, 1951 |